US008723365B2

(12) United States Patent
Bordry et al.

(10) Patent No.: US 8,723,365 B2
(45) Date of Patent: May 13, 2014

(54) DEVICE FOR FEEDING A CHARGE INCLUDING INTEGRATED ENERGY STORAGE (75) Inventors: Frederick Bordry, Meyrin (CH); Jean-Paul Burnet, Chevry (FR); Claude Fahrni, Delémont (CH); Alfred Rufer, Villars-s-Yens (CH)

(73) Assignees: Ecole Polytechnique Federale de Lausanne (EPFL), Lausanne (CH); European Organization for Nuclear Research, Meyrin (CH)

( * ) Notice: Subject to any disclaimer, the term of this patent is extended or adjusted under 35 U.S.C. 154(b) by 1547 days.

(21) Appl. No.: 12/314,775

(22) Filed: Dec. 16, 2008

(65) Prior Publication Data
US 2010/0007209 A1 Jan. 14, 2010

(30) Foreign Application Priority Data
Jun. 16, 2006 (EP) .................................. 06012385
Jun. 7, 2007 (WO) ................ PCT/CH2007/000284

(51) Int. Cl.
*H02J 1/00* (2006.01)
(52) U.S. Cl.
USPC .............................................. 307/82; 307/77
(58) Field of Classification Search
USPC ........... 307/82, 77, 54, 61, 63, 49, 71; 363/65
See application file for complete search history.

(56) References Cited

U.S. PATENT DOCUMENTS

| 5,638,263 | A | 6/1997 | Opal et al. |
| 5,694,307 | A | 12/1997 | Murugan |
| 5,737,202 | A * | 4/1998 | Shimamori ..................... 363/65 |
| 2003/0214824 | A1 | 11/2003 | Corzine |
| 2005/0157525 | A1 | 7/2005 | Hanson |
| 2008/0179960 | A1 * | 7/2008 | Belson et al. .................. 307/82 |

FOREIGN PATENT DOCUMENTS

| JP | 04261359 A * | 9/1992 |
| WO | WO 03/038980 | 5/2003 |
| WO | WO 2007/143868 | 12/2007 |

OTHER PUBLICATIONS

Alfred Rufer, et al. "A Supercapacitor-Based Energy-Storage system for Elevators with Soft Commutated Interface," IEEE Transactions on Industry Applications, IEEE Service Center, vol. 38, No. 5, Sep. 2002.

(Continued)

*Primary Examiner* — Fritz M Fleming
(74) *Attorney, Agent, or Firm* — Duane Morris LLP (57) ABSTRACT A device for supplying power to a load, requiring both a pre-determined supply of electrical power and high power for short durations of the operating cycle of the load, where the operating cycle is repeated. The power supply device includes a connection to an electrical grid, an AC voltage transformation circuit, a voltage rectification means and a plurality of DC/DC converters mounted in series to terminals of the load. Each of the DC/DC converters has a storage capacitor mounted in parallel to it and at least one of the DC/DC converters is supplied directly by the voltage rectification means. At least another one of the DC/DC converters is not supplied directly by the voltage rectification means. The power supply device may compensate for losses in the power supply device and load, and may substantially continually and uniformly balance voltages at terminals of the storage capacitors.

20 Claims, 8 Drawing Sheets

(56) References Cited

OTHER PUBLICATIONS

Rufer, A., et al., "A Supercapacitor-Based Energy Storage System for Elevators with Soft Commutated Interface," Conference Record of the 2001 IEEE Industry Applications Conference. 36th IAS Annual Meeting. Chicago, IL. Sep. 30-Oct. 4, 2001, vol. 1 of 4, Conf. 36, Sep. 30, 2001, p. 1413-1418.

Nowak, M., et al., "Converters with AC Transformer Intermediate Link Suitable as Interfaces for Supercapacitor Energy Storage," Power Electronics Specialists Conference, 2004 IEEE 35th Annual, Aachen, Germany, Jun. 20-25, 2004, p. 4067-4073.

Barrade, et al., "Energy Storage System Using a Series Connection of Supercapacitors with an Active Device for Equalising the Voltages," International Power Electronic, 2000, Tokyo Japan.

European Patent Office, International Search Report, International Application No. PCT/CH2007/000284, mailed Sep. 21, 2007.

* cited by examiner

DEVICE FOR FEEDING A CHARGE INCLUDING INTEGRATED ENERGY STORAGE

RELATED APPLICATIONS

The instant application claims the priority benefit of PCT Patent Application No. PCT/CH2007/000284 filed on 7 Jun. 2007 which along with the instant application claims the priority benefit of European Patent Application No. 06 012 385.8 filed on 16 Jun. 2006 the entirety of each are hereby incorporated by reference.

BRIEF SUMMARY OF THE INVENTION

The supply device allows a load 1 to be supplied with a relatively low mean power on the one hand, and sharp peaks of power on the other hand, using energy storage capacitors (21) placed in series. Each of the energy storage capacitors (21) is connected to a DC/DC converter (200, 20), with control devices (5) provided to equalize the voltages at the capacitor terminals and the power delivered by each terminal.

BACKGROUND OF THE INVENTION

This invention concerns a device for supplying a load with electric power, said power supply device comprising integrated energy storage.

Some energy consumers require a supply of predetermined electrical power as well as the supply of high power for a relatively short part of the cycle. Such cycles may be repeated. Examples of this type of consumer are the electromagnets of particle accelerators, rolling mill drives, lifts and elevators, cranes, etc. The direct connection of such consumers to the electrical power grid can cause serious grid disturbances. Devices are thus generally installed between the grid and the consumer to store energy so that it can be delivered at the required moment, thus avoiding peaks in power requirements being met directly by the power grid.

In addition, common energy supply devices are generally fitted with resistive energy dissipators that dissipate energy when the power flux is reversed, which obviously wastes a lot of energy.

Energy storage devices include storage systems for mechanical energy, for example the kinetic energy of a flywheel, storage systems for electrostatic energy, for example in capacitors and supercapacitors, storage systems for magnetic energy, for example in storage chokes, and storage systems for electromechanical energy, for example in accumulator batteries.

In particular, the article "A supercapacitor-based energy-storage system for elevators with soft commutated interface" by A. Rufer, published in "IEEE Transactions on Industry Applications", vol. 38, No. 5, September/October 2002, describes an application for a lift or elevator in which power smoothing is achieved through a combination of a static converter and a variable-speed drive system. In this instance, the static converter allows a continuous bidirectional variation of the power flow using an intermediate DC circuit, which, in turn, is powered by a rectifier circuit located between the DC circuit and the primary AC grid. The article describes a means of providing the system with instantaneous power through a configuration comprising not only drive, static converter and rectifier components but also a storage device in the form of a bank of supercapacitors connected to an intermediate DC circuit using an additional static converter.

The U.S. Pat. No. 5,638,263 describes a similar device in which each DC/DC converter is supplied via its own voltage rectifier, which leads to a system which is clearly more expensive and clearly less reliable.

One of the aims of this invention is thus to propose an electric power supply device in which an energy storage device is positioned within the intermediate DC circuit(s) itself/themselves, obviating the need for an additional static converter. In the first instance, this eliminates power flows to and from an additional converter, thus improving the energy efficiency of the power device and reducing operating costs.

Another aim of the invention is to propose a bidirectional static converter device capable of satisfying a consumer's intermittent high power requirements and for which the necessary energy is taken directly from the intermediate DC circuit(s).

The discharge of energy from the intermediate DC circuit(s), which mainly comprise a series/parallel combination of capacitors, causes a variation in the level of DC voltage. This variation corresponds to a decrease in voltage when energy is drawn and an increase in voltage when energy is returned. To supply the consumer, e.g. the drive machine, under acceptable conditions, the capacitors of the intermediate DC circuit(s) must be adequately sized and voltage fluctuations of the DC circuit must be corrected eventually by modifying the modulation rate imposed on the static converter between the DC circuit and the consumer.

In the specific context of the invention's application to the power supply of the Proton Synchrotron at CERN in Geneva, the goal is to supply the consumer, in this case the magnet coils, with a high level of voltage, of the order of 10 kV. To this end, one of the aims of the invention is to propose a power supply device comprising several static converters placed in series, each including an intermediate DC capacitive circuit serving as a storage element. In a case like this, only some of the converters are supplied from the primary grid. The other converters/storage devices also have an intermediate DC capacitive circuit that is discharged or charged as energy is supplied to the magnet coils or recovered from them.

In such an application, current flows in the converters, the magnet coils and other components results in energy losses that cause a slow discharge of the capacitive circuits from one power cycle to the next. To compensate this discharge, another aim of the invention is to propose a device for controlling and adjusting the operation of all the converters so that energy can be transferred from one converter to another while the delivered current is flowing, thus allowing the mean values of the voltages of the intermediate DC circuits to be maintained by transferring energy from one converter to another, in particular from a powered converter to an unpowered converter.

To achieve this, power supply device of a load with the features mentioned in claim 1 is proposed, with embodiments as described in the dependent claims.

The following description concerns one embodiment of the invention, as applied to the realisation of a power supply for the Proton Synchrotron at CERN in Geneva. This description is provided merely as an example of how the invention can be realised, as many other applications are also possible. Numerical values are given for illustrative purposes only and refer to this particular energy consumer. The description below must be read with reference to the annexed drawing, which comprises the following figures.

DETAILED DESCRIPTION

Figure 1:
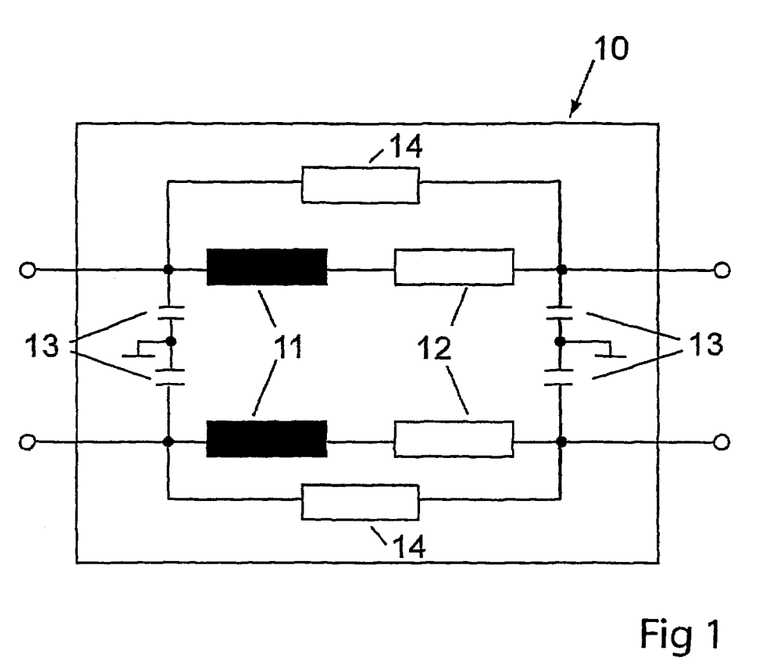
FIG. 1 shows an equivalent circuit of an accelerator magnet.

FIG. 1 shows the equivalent circuit of a coil of a bending magnet 10 in the Proton Synchrotron; the coil is divided into two half-coils. The inductance 11 of the coil equals L=9 mH, its internal resistance 12 equals R=3.2 mΩ, its capacitance 13 with respect to the magnetic core equals C=22 nF and its damping resistance 14 equals p=136Ω. The Proton Synchrotron comprises 101 coils like those shown in FIG. 1, placed in series.

Figure 2:
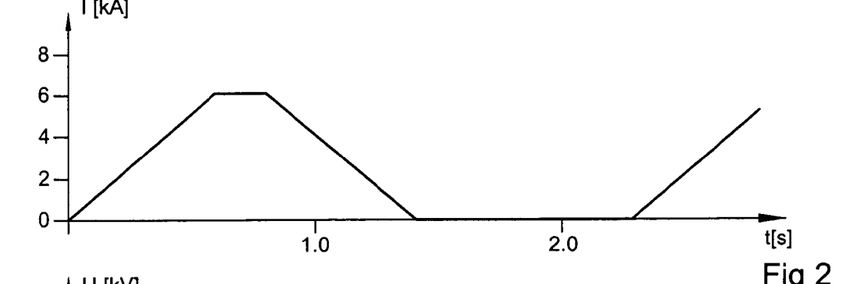
FIG. 2 shows a diagram of the current supplied to the magnet of the previous figure, i.e. the consumer.

FIG. 2 shows in diagram form an example of a current pulse applied generally to the consumer described above; the pulse consists first of a steady ramp-up lasting about 0.65 seconds, followed by a plateau at approximately 6 kA for about 0.2 seconds, then a steady ramp-down of the current to zero, also lasting about 0.65 seconds. The pulse is repeated approximately every 2.4 seconds.

Figure 3:
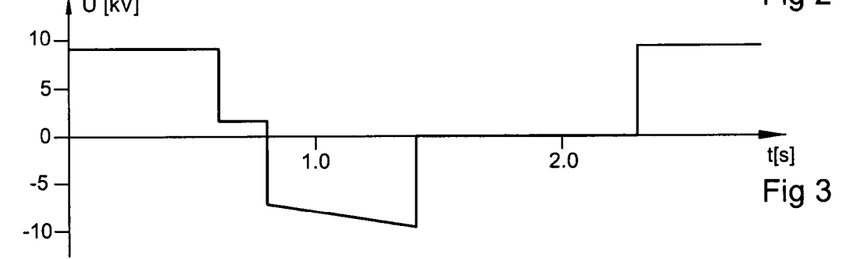
FIG. 3 shows a diagram of the mean voltage applied at the consumer terminals.

The shape of the voltage pulse that is applied at the terminals of the complete set of Synchrotron coils to achieve the above-mentioned current pulse is shown in FIG. 3; starting from zero, the voltage rises sharply to approx. 9 kV, then remains stable throughout the time the current is ramping up in the coils; this voltage has a second plateau at approximately 2 kV during the current plateau, followed by a sequence at negative voltage falling from approximately −7.5 kV to approximately −10 kV during the current ramp-down phase, with the voltage returning to zero at the end of the cycle.

Figure 4:
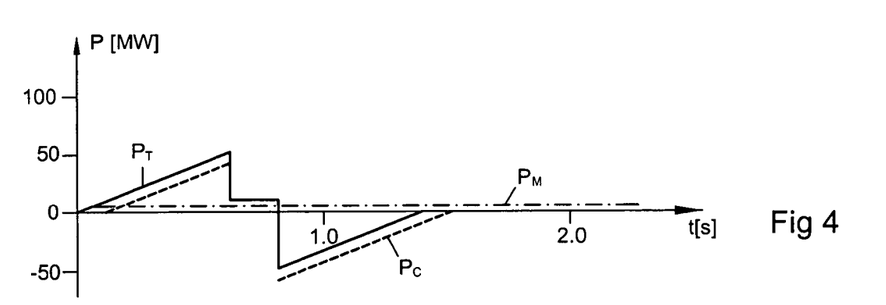
FIG. 4 shows a diagram of the instantaneous power required by the consumer.

The previous two diagrams provide the basis for the diagram in FIG. 4, which shows the instantaneous power $P_T$ that needs to be supplied to the consumer. It can be seen that this instantaneous power varies between approximately +50 MW and −50 MW; such power variations cannot be tolerated by the power grid. The mean power $P_M$ supplied during the cycle is much lower: around 5 MW; this curve represents essentially the power supplied by the grid to compensate the system's losses, as we shall see later. The difference between the two curves represents the instantaneous power $P_c$ that needs to be supplied by the storage device.

Figure 5:
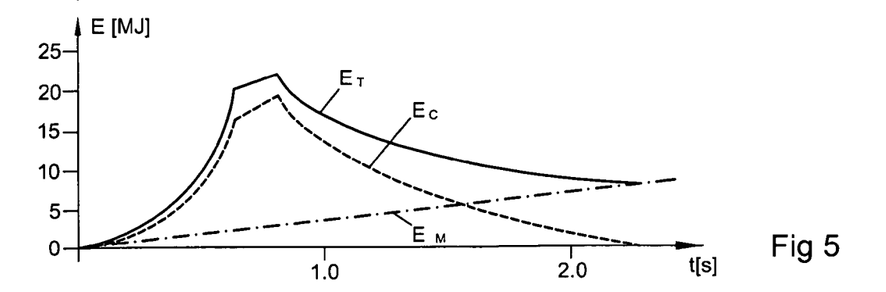
FIG. 5 shows a diagram of the energy supplied to the consumer.

FIG. 5 shows the shape of the curves representing the power supplied to the load; these curves are obtained by integrating the curves of the previous figure over time. We thus see a first curve $E_T$ representing the total energy supplied to the load, a second curve $E_M$ representing the energy supplied by the grid and a third curve $E_c$ representing the energy supplied by the storage device. It can be seen that the latter may reach values of the order of 20 MJ. This energy is supplied to the coils essentially during the time the current is being ramped up, a surplus being supplied during the current plateau to compensate the losses, and the coils then recharge the storage device as the current ramps down.

Figure 6:
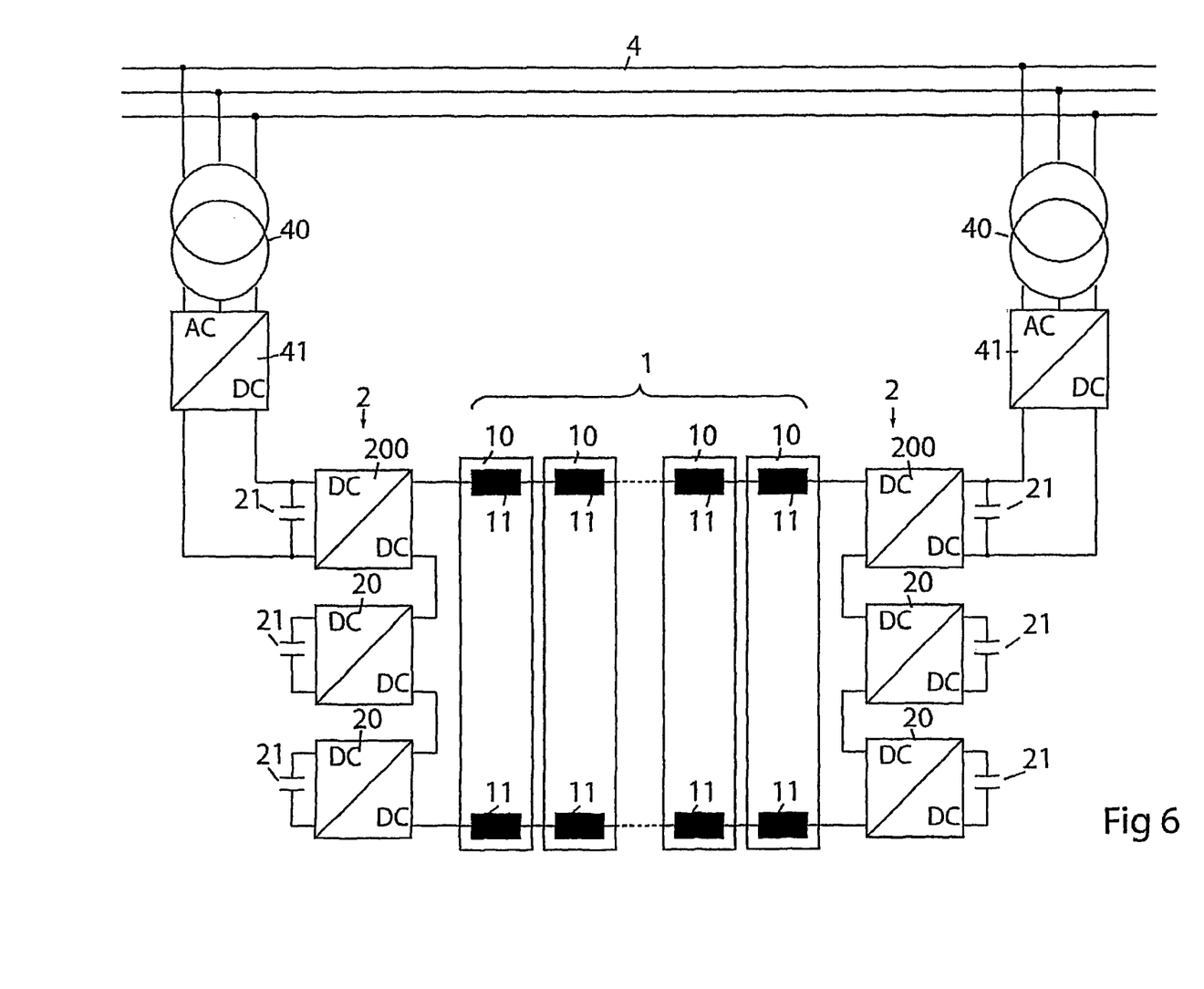
FIG. 6 shows an embodiment of the consumer power supply device.

In FIG. 6, which shows a power supply device using the invention as applied to the power supply of the CERN Proton Synchrotron, the load 1 comprises 101 coils 10 as described above with reference to FIG. 1. Only 4 coils are shown in the figure and they are represented only by their inductors 11; the other components of the equivalent circuit are omitted for simplicity. It can be seen in the figure that the load 1 is supplied at its two opposite ends, allowing the supply voltage to be halved, by two sets of DC/DC converters 2, each set comprising three cells 20, 200 in series. The cells 200 are directly connected to the rectifier cells 41, while the cells 20 are not. The converters 2 are used as variable-voltage regulators and as main energy storage elements by virtue of their DC capacitors 21.

Considering the load 1 and the sets of converters 2, and given the inductive behaviour of the load 1 and the capacitive behaviour of the converters 2, there is an exchange of energy between the load 1 and the converters 2; the energy stored in the form of current flowing in the coils 10 is recovered by the capacitors 21 of the converters 2 when the current in the coils 10 decreases, and returns to the coils 10 during the phase in which the current increases, wherein the phases of current variation are as described above with reference to FIG. 2. The energy is stored in the capacitors 21 in accordance with the general law governing the operation of capacitors $E=\frac{1}{2}CU^2$. The power supply constituted by the converters 2, or the cells 20, 200 of the DC/DC converters connected in series, thus makes it possible to supply the coils 10 with a positive voltage that serves to increase the current in the coils 10 and a negative voltage when the current decreases.

Figure 7:
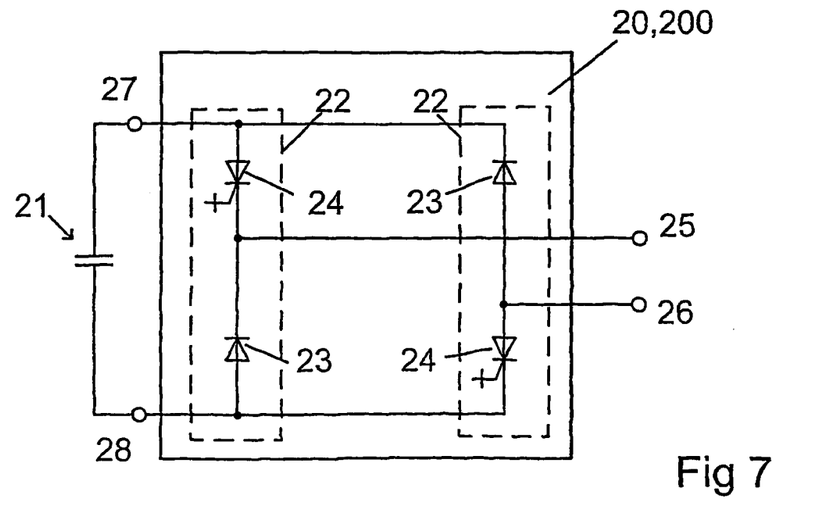
FIG. 7 shows a first embodiment of a DC/DC converter cell.

The cells 20 and 200 of the DC/DC converters 2 are all the same; FIG. 7 shows a preferred embodiment. Each cell 20, 200 consists of a reversible chopper circuit comprising two branches 22, each comprising two elements, i.e. a diode 23 and a semi-conducting component 24 that can be turned on and off such as a GTO (gate turn off) thyristor or IGCT (integrated gate controlled thyristor), as represented in the figure, or an IGBT (insulated gate bipolar transistor), with an H-bridge assembly as in the figure. For applications where the level of voltage so requires, it is possible to use several semi-conducting components placed in series. Each cell 20, 200 comprises a storage capacitor 21 placed on the DC side of the cell. The voltage transformation ratio, namely the ratio between the mean value of the output voltage across terminals 25 and 26 and the input voltage across terminals 27 and 28, i.e. the voltage at the terminals of capacitor 21, may be controlled for each DC/DC converter cell 20, 200 by a modulation circuit allowing the semi-conductors 24 to be turned on and off for variable durations, as described below.

Figure 8:
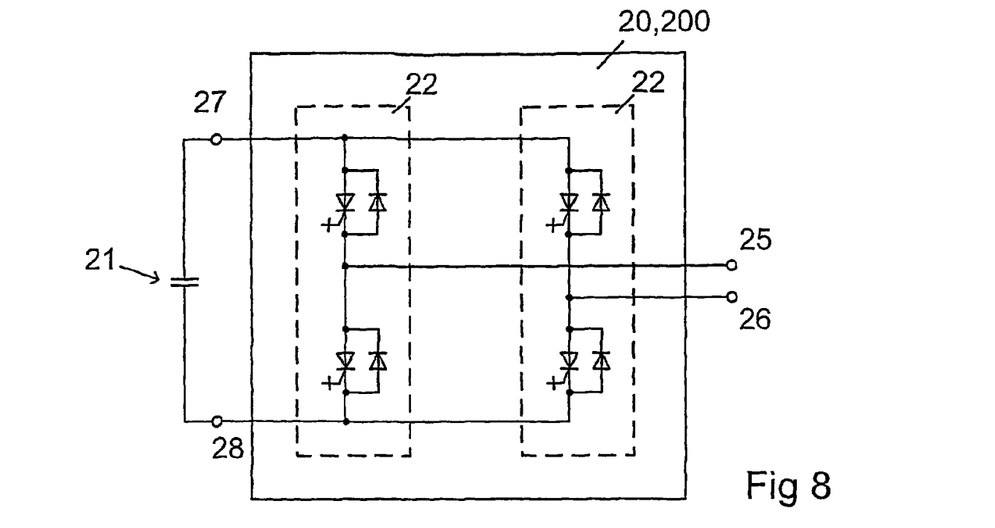
FIG. 8 shows another embodiment of a DC/DC converter cell.
Figure 9:
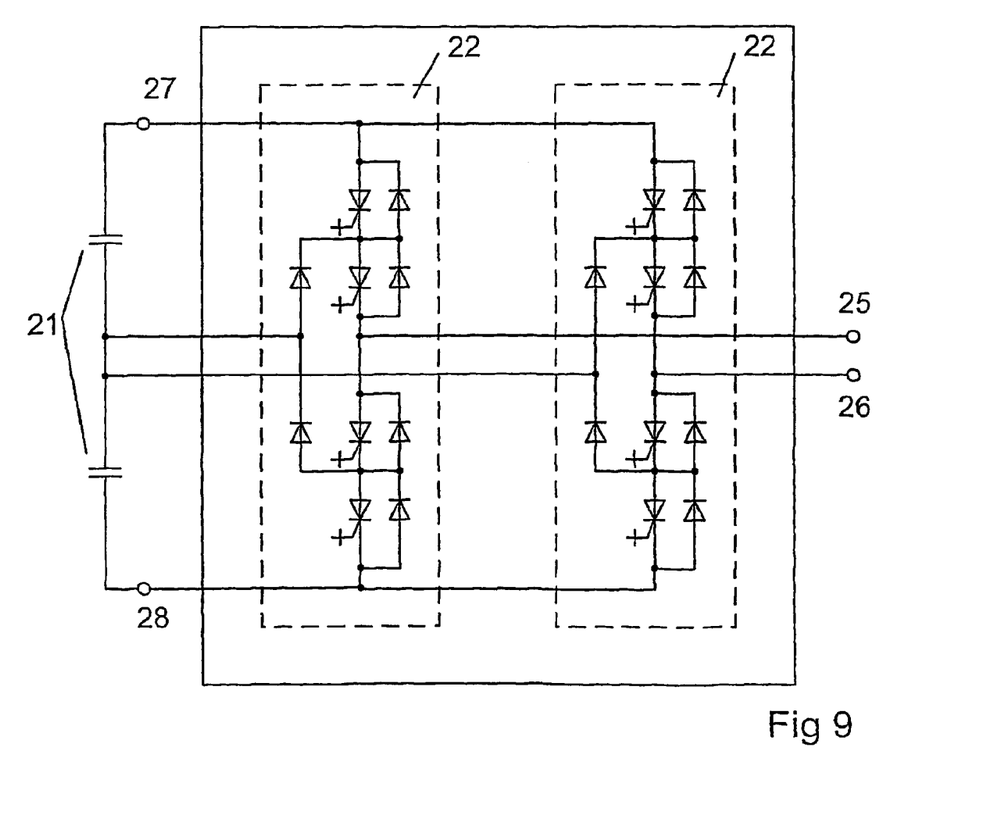
FIG. 9 shows still another embodiment of a DC/DC converter cell.

Other embodiments of DC/DC converter cells 20, 200 are shown in figures 8 and 9. In these embodiments inverter branches of known technology are used, in accordance with standard embodiments resulting from industrial applications. The branches 22 are made up of "two-level" inverters, as shown in FIG. 8, or "three-level" inverters, as shown in FIG. 9. In the latter case, it can be seen that the storage capacitor 21 connected with this type of cell 20, 200 is replaced by two capacitors in series. Additional components such as switching circuits, inductors, capacitors, resistors, etc., may be included in such circuits; they are not shown in the figures for the sake of simplicity.

If high current needs to be supplied, the DC/DC converters 20, 200 may include several branches 20 in parallel.

The number of DC/DC converter cells 20, 200 depends essentially on the application under consideration and, more particularly, on the level of voltage required compared with the maximum voltage a capacitor can withstand. In the present case of the power supply to the CERN Proton Synchrotron, six cells 20, 200 in series are provided, divided into two groups of three as shown in FIG. 6. Thus, for a maximum total voltage at the load of 9 kV, as in FIG. 2, this voltage is divided by six according to the number of cells 20, 200, giving a mean voltage of the order of 1.5 kV at the terminals of each cell 20, 200, or at the terminals of each capacitor 21.

It should be noted that, to be able to supply a mean voltage of 1.5 kV regardless of the fluctuation of the input DC voltage of a DC/DC converter cell 20, 200, this value must lie between a maximum higher than 1.5 kV and a minimum theoretically equal to 1.5 kV. The principle of correcting the discharge voltage of the capacitors by increasing the duty cycle is explained below, with reference to FIG. 13.

The DC/DC converter cells 20 and 200 operate by pulse-width modulation (PWM) with a pulse frequency (chopper frequency) that is generally constant. The control signals for turning the semi-conductors 24 on and off are generated by modulators, as explained below.

Figure 10:
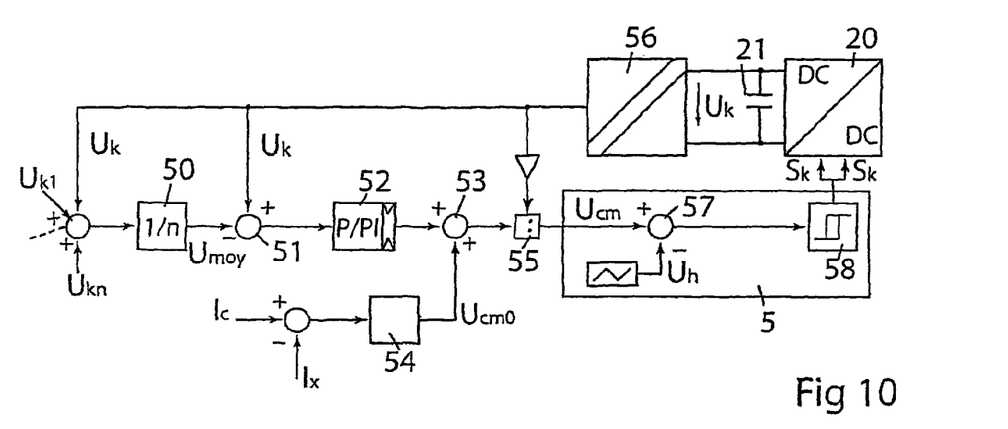
FIG. 10 shows an embodiment of a control modulator controlling a DC/DC cell not directly connected to the power grid.

One embodiment of a pulse-width modulator (PWM) 5, connected to a DC/DC converter cell 20 not directly connected to a rectifier cell 41, is shown in figure 10. Adjusting the current as described below ensures that the voltages at the terminals of the capacitors 21 are continually and uniformly balanced.

In the first instance, the voltages $U_{k1}$ to $U_{kn}$ across the terminals of all the capacitors 21, as measured by the measurement device 56, are added together and a mean value $U_{moy}$ is then generated in element 50. This $U_{moy}$ value is then compared in a comparator 51 to the voltage $U_k$ measured at the terminals of the capacitor 21 of the cell 20 which is being controlled. Through a P/PI corrector 52, an incremental value is added or subtracted, by a comparator 53, to or from the main duty cycle setting supplied by a state controller 54, with the main duty cycle setting being calculated on the basis of the value of the current to be supplied to the load and state values X measured on the load. The comparator 53 thus supplies the voltage setpoint $U_{cm0}$. The latter is introduced into a divider 55 which also receives a voltage proportional to the voltage $U_k$, measured at the terminals of the capacitor 21.

The output signal of the divider is equivalent to $U_{cm}=U_{cm0}*k_2/k_1*U_k$ wherein this signal $U_{cm}$ is then compared to a triangular signal $U_h$. The resulting signal is introduced into a discriminator 58, producing a binary signal $S_k$, sent as the control signal to each of the switchable semiconductors 24, either to the gates of the GTO thyristors or to the bases of the IGBT transistors in the DC/DC converter cell 20. Thus, when the capacitor 21 discharges, a voltage correction can be performed by dividing $U_{cm}$ by a signal proportionate to $U_k$. Each of the above-mentioned DC/DC converter cells 20 is controlled by a modulator 5, as described above.

Figure 11:
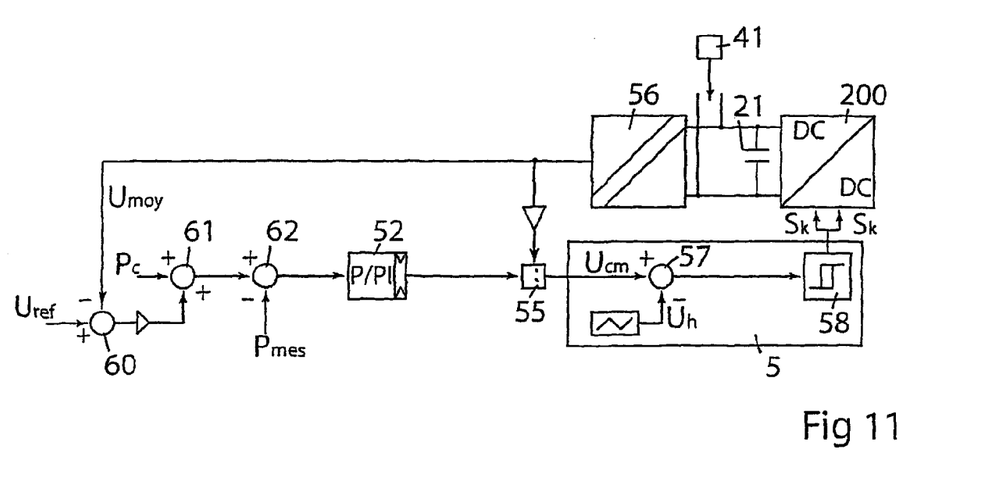
FIG. 11 shows an embodiment of a control modulator controlling a DC/DC cell directly connected to the power grid.

As shown in FIG. 11, the DC/DC converter cells 200 that are connected directly to the rectifier cells 41 are controlled by a power control ensuring that they supply the desired amount of power to compensate the losses in the supply device and in the load.

The mean value $U_{moy}$ of the voltages of the capacitors 21, measured by the measurement device 56 immediately prior to the duty cycle, is compared in the comparator 60 to a reference value $U_{ref}$. The adder 61 is then used to add a proportion of the resulting signal to a value $P_c$, which represents the ideal power setting calculated on the basis of a model of the system that allows the instantaneous power loss to be determined as a function of the current circulating in the magnets 10. If the losses are compensated exactly, the value $U_{moy}$ immediately prior to the cycle will be identical to the reference value $U_{ref}$ and the capacitors 21 will be fully charged. Only if these values are different, a correction will be triggered by the comparator 60, in order to maintain the capacitors 21 at their reference voltage. The correction signal supplied by the comparator 61 is compared to the measured power $P_{mes}$ in a comparator 62, and the resulting signal of the comparator is used to adjust the voltage at the terminals of the capacitor 21 in the same way as described above and using devices comparable to those described with reference to FIG. 10.

Figure 12:
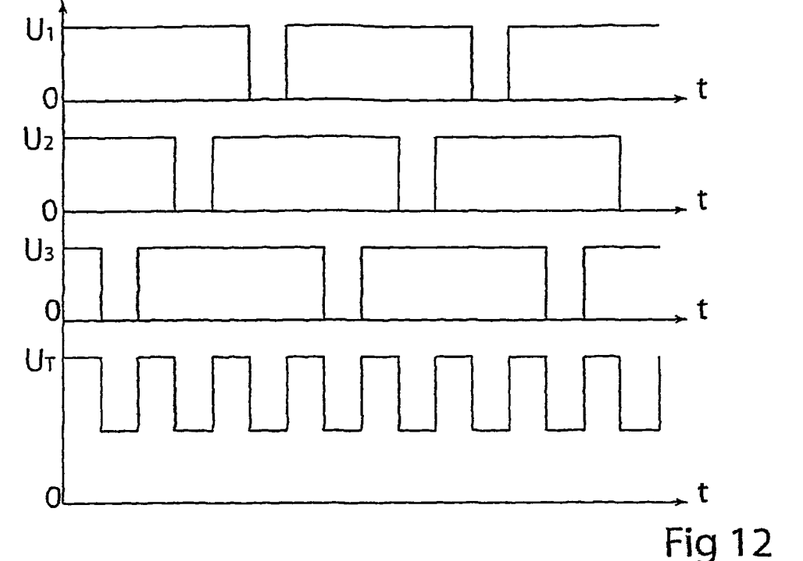
FIG. 12 is a schematic diagram of the voltages at the terminals of three DC/DC converters in series and the resulting voltage.

Since the cells 20 are assembled in series, they can be controlled by modulators generating control signals $S_k$ that are not in phase with each other but are staggered relative to each other in order to obtain an output voltage supplied to the coils 10 with a ripple smaller than would be the case if all the cells 20 were controlled by signals in phase. An example of the output voltages is given in FIG. 12, which shows the voltages $U_1$, $U_2$ and $U_3$ at the terminals 25 and 26 of the cells 20, each of which has an amplitude variation of 100%. The voltage $U_T$, which represents the sum of the voltages of the cells, or the voltage at the terminals of the load 1, has an amplitude variation of only 33%. At the same time, its ripple frequency has increased considerably.

Each DC/DC converter cell 20, 200 is connected in series to the neighbouring cell by its output terminals 25, 26.

During the phase when power is being supplied to the coils 10, i.e. the current ramp-up phase, energy is drawn from the capacitors 21, causing them to discharge. It follows that the output voltage of each DC/DC converter cell 20, 200 between terminals 25 and 26 depends on the value of the voltage of its associated capacitor 21.

In order to supply the load 1 with the desired voltage, irrespective of the voltage fluctuations in the capacitors 21, a control device is needed to correct the modulation rate of each cell 20, 200 according to the supply voltage of the capacitor 21.

The mean value $V_{moy}$ of the output voltage of a cell 20, 200 is given by the following equation:

$$V_{moy}=t_1/T_p*U_k$$

Where:
$t_1$=pulse duration
$T_p$=pulse repetition period
$U_k$=voltage at the terminals of the capacitor.

Figure 13:
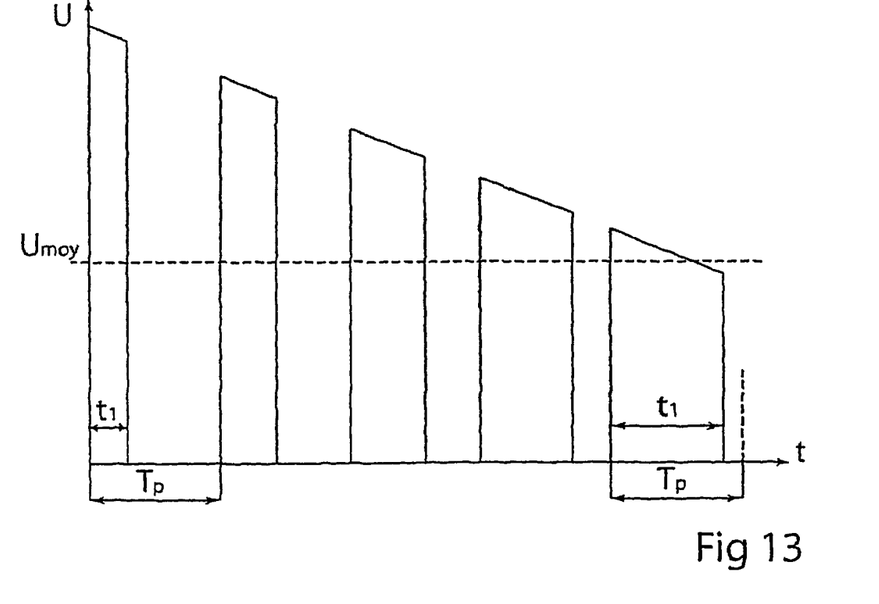
FIG. 13 shows the rate of voltage decrease at the terminals of a DC/DC converter, with a varying duty cycle.

FIG. 13 schematically illustrates the principle of the correction of the capacitor discharge through an increase in the duty cycle of the modulator. At the beginning of the discharge, as shown on the left-hand side of the figure, the duty cycle is approximately 50%; by the time the capacitor 21 has discharged, as shown on the right-hand side of the figure, the same duty cycle is approximately 90%.

During the discharge phase of the coils 10, when the current is being ramped down, energy is transmitted to the capacitors 21, causing them to re-charge. The output voltage of each DC/DC converter cell 20, 200 between terminals 25 and 26 then depends on the value of the voltage of the capacitor 21 with which it is associated. This voltage variation affects the total voltage supplied to the coils 10 by the cells 20, 200 of the DC/DC converter placed in series.

The charging and discharging cycles of the coils 10, described above, cause losses in the various circuit components. To compensate these losses, energy is taken from the electrical grid 4 (see FIG. 6). To this end, the DC/DC converters 2 are connected to the electrical grid 4 via transformers 40 and rectifier cells 41, powering two DC/DC converter cells 200. The transformers 40 serve only to obtain an acceptable voltage level at the input of the rectifier cells 41 and to galvanically isolate the load from the grid.

Figure 14:
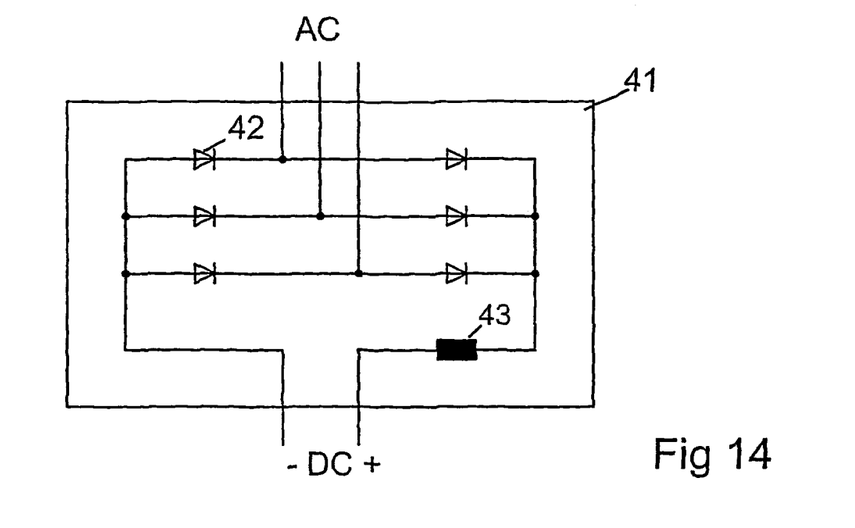
FIG. 14 shows a first example of an embodiment of a rectifier cell using a three-phase diode bridge.

In a first embodiment, the rectifier cells 41 comprise a diode bridge 42, as shown in FIG. 14. In this embodiment, there is no control of the diode rectifiers 42 so the voltage at the terminals of the capacitors 21 of the DC/DC converter cells 200 cannot be modified. Therefore, such a device does not allow use of the energy stored in the capacitors 21, directly connected to the above-mentioned DC/DC converter cells 200, which are connected to the rectifier cells 41. A smoothing choke 43 is provided at the positive output of the bridge.

Variation of the output voltage of the rectifier cells 41 remains possible, given that the DC/DC converter cells 200 are operating according to the PWM principle, as described above. Thus, while the load current is being ramped up, there is zero energy contribution from the capacitors 21 of the DC/DC converter cells 200, directly supplied by the rectifier cells 41, namely the two cells 200 shown at the top of the diagram in FIG. 6, so the power is entirely supplied by the rectifier cells 41, or by the electrical network. In this case, only those capacitors 21 of the DC/DC converter cells 20 that are not directly connected to rectifier cells 41, namely the four cells at the bottom of the diagram in FIG. 6, operate as storage elements.

It is preferable to select rectifier cells 41 resembling one of the following two embodiments, thus allowing all the capacitors 21 of the DC/DC converter cells 20 to operate as storage elements.

Figure 15:
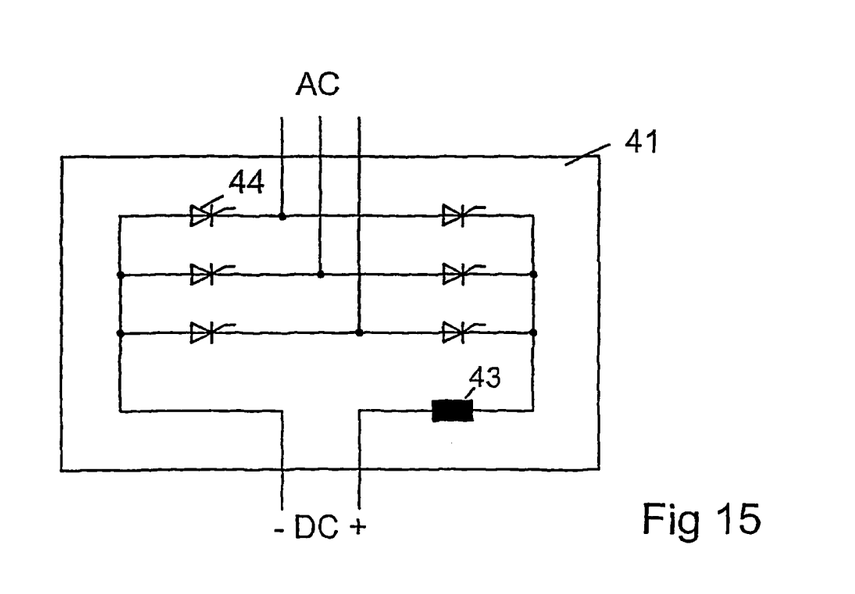
FIG. 15 shows a second example of an embodiment of a rectifier cell using a three-phase thyristor bridge.

In the second embodiment, the rectifier cells 41 are formed from a thyristor bridge 44, as shown in FIG. 15. In this embodiment, it thus becomes possible to vary the voltage at the terminals of the capacitors 21. To control the thyristor bridges, the ignition angle α of the thyristors 44 will be varied according to the voltage variation at the terminals of the capacitors 21. This variation of the voltage will allow the capacitors 21 to be discharged. In this case, the instantaneous power supplied by the thyristor rectifier cells 41 is not equal to the instantaneous power transmitted to the load. As for the previous embodiment, a smoothing choke 43 is provided at the positive output of the cell 41.

The use of thyristors in the rectifier cells 41, controlling the ignition angle α of the thyristors 44, entails a variation of the phase angle between the voltage and the alternating current at the input of the rectifier cells 41, thereby drawing reactive power from the primary grid. These phenomena are described and explained in "H. Bühler—Electronique de puissance—Traité d'Electricité—vol XV—PPUR, Presses Polytechniques et Universitaires Romandes" Chapter 9, paragraphs 9.2.4 and 9.4.1.

In order to limit the reactive power drawn, a sequential control such as the one described in Chapter 9.5 of the above-mentioned manual can be used.

Figure 16:
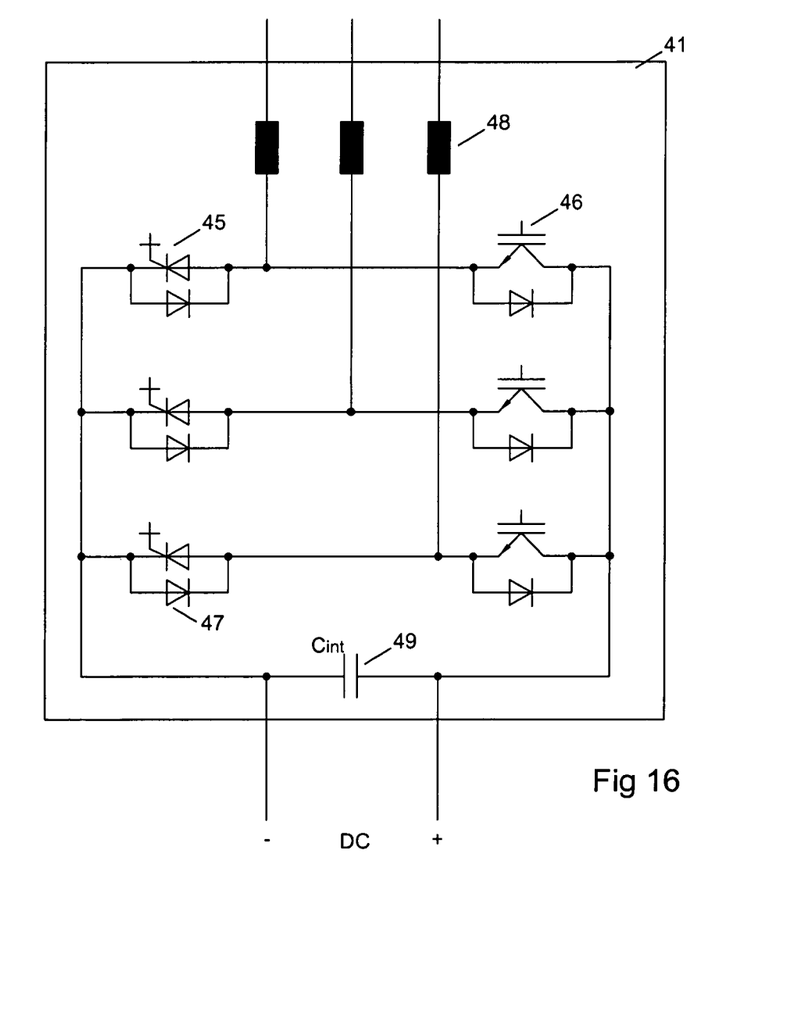
FIG. 16 shows a third example of an embodiment of a rectifier cell using a pulse inverter.

In a third embodiment, the rectifier cells 41 are formed from pulse rectifiers as shown in FIG. 16. In this case, the rectifier cell 41 includes a bridge assembly formed from GTO or IGCT-type thyristors 45, as shown on the left-hand side of the figure, or IGBT-type transistors 46, as shown on the right-hand side of the figure, it being understood that the bridge is formed from only semiconductor elements of one or the other type. Each of the above-mentioned semiconductor elements 45 or 46 includes a reverse conducting diode 47. Where a pulse rectifier cell 41 is used, the connections with the primary AC electrical grid must be made using decoupling and smoothing inductors 48, as shown in the figure.

With this kind of assembly, there is a first advantage in the form of the primary alternating current, which is very close to a sinusoidal form and whose harmonics are linked to the pulse frequency. Unlike the form of the alternating currents of the diode or thyristor rectifiers described above, the alternating currents of the pulse rectifiers 41 are free from low-frequency harmonics ($\gamma$=5, 7, 11, etc.).

Another advantage of such an assembly is that it allows full control of the phase shift of the current fundamental wave, with any desired value of cos φ, making it possible to operate with a unity cos φ or even to use the rectifier cells as reactive power compensators, if necessary.

A pulse rectifier cell 41 such as the one described here imposes a lower limit on the output voltage supplied to the capacitors 21; this voltage must not fall below the peak value of the input alternating voltage of the cell 41. Should this DC voltage fall below this peak value, only the diodes 47 would remain active, even if the thyristors 45 or the transistors 46 were not activated. The rectifier cell 41 would then operate as a diode rectifier, that would not be controllable.

Above this lower limit value, it is possible to vary the voltage at the terminals of the capacitors 21, and thus make use of their storage capacitance, in other words their ability to store and release energy.

For the pulse rectifier to operate correctly, it is necessary for the output on the DC side to have a minimum capacitance $C_{int}$, indicated by 49 in the figure. Where the capacitors 21 are relatively close to the cells of the pulse rectifiers 41, they may serve as output capacitors for those cells.

It can be seen that the above description of a power supply device is given as an example of a possible embodiment of a power supply device capable of delivering a relatively low mean power together with power peaks supplied by integrated storage devices. In particular, the layout of the circuits, components, semiconductor elements or number of cells may differ from what is described above, according to the type of load encountered or the current pulse to be supplied.

The invention claimed is:

1. A device for supplying power to a load requiring both a pre-determined supply of electrical power and high power for short durations of the operating cycle of the load, where the operating cycle is repeated, the power supply device comprising: a connection to an electrical grid; an AC voltage transformation circuit; a voltage rectification means; and a plurality of DC/DC converters mounted in series to terminals of said load, wherein said DC/DC converters are connected to said electrical grid via said AC voltage transformation circuit and said voltage rectification means wherein a first of said DC/DC converters is connected to the output of said voltage rectification means and a second of said DC/DC converters is connected to the output of said first DC/DC converter, and wherein each of said plural DC/DC converters has a storage capacitor mounted in parallel to it, and wherein said first DC/DC converter is supplied directly by said voltage rectification means, and wherein said second DC/DC converter is not supplied directly by said voltage rectification means, the storage capacitor mounted in parallel to said second DC/DC converter being adapted to exchange energy with said load.

2. A power supply device according to claim 1, wherein said rectification means comprises at least one rectifier cell comprising six-diodes mounted in a bridge assembly and a smoothing choke mounted in series at a positive DC output of said rectification means.

3. A power supply device in accordance with claim 2 wherein each of said plural DC/DC converters comprises a reversible chopper circuit comprising two branches with each branch comprising one or more diodes mounted in series and one or more switchable semiconductor elements mounted in series and in anti-parallel connection to said one or more diodes, and wherein said storage capacitor is mounted on terminals of said branches.

4. A power supply device in accordance with claim 3 wherein said at least one DC/DC converter directly supplied by said rectification means further comprises a modulator which provides a power adjustment signal to said at least one DC/DC converter directly supplied by said rectification means to thereby compensate for losses in said power supply device and in said load.

5. A power supply device in accordance with claim 4 wherein said at least one DC/DC converter not directly supplied by said rectification means further comprises a modulator which provides a current adjustment signal to thereby substantially continually and uniformly balance voltages at terminals of said storage capacitors.

6. A power supply device in accordance with claim 5 wherein said current adjustment signals are staggered with respect to one another in order to stagger voltages generated by said at least one DC/DC converters not supplied directly by said rectification means so that a voltage supplied to said load has a reduced ripple.

7. A power supply device in accordance with claim 2 wherein each of said plural DC/DC converters comprises a reversible chopper circuit comprising two branches wherein each branch comprises one or more branches of two-level or three-level inverters.

8. A power supply device in accordance with claim 7 wherein said at least one DC/DC converter directly supplied by said rectification means further comprises a modulator which provides a power adjustment signal to said at least one DC/DC converter directly supplied by said rectification means to thereby compensate for losses in said power supply device and in said load.

9. A power supply device in accordance with claim 8 wherein said at least one DC/DC converter not directly supplied by said rectification means further comprises a modulator which provides a current adjustment signal to thereby substantially continually and uniformly balance voltages at terminals of said storage capacitors.

10. A power supply device in accordance with claim 9 wherein said current adjustment signals are staggered with respect to one another in order to stagger voltages generated by said at least one DC/DC converters not supplied directly by said rectification means so that a voltage supplied to said load has a reduced ripple.

11. A power supply device as per claim 1, wherein said rectification means comprises at least one rectifier cell comprising six-thyristors mounted in a bridge assembly and a smoothing choke mounted in series at a positive DC output of said rectification means.

12. A power supply device as per claim 1, wherein said rectification means comprises at least one pulse rectifier cell comprising six controllable semiconductor components, GTO or IGCT-type thyristors or IGBT-type transistors, wherein each of said controllable semiconductor components comprises a diode in anti-parallel connection; and a decoupling inductance mounted at each AC input of said rectification means.

13. A power supply device as per claim 1, wherein one of said DC/DC converters comprises: a reversible chopper circuit comprising two branches with each branch comprising one or more diodes mounted in series one or more switchable semiconductor elements mounted in series and in anti-parallel connection to said one or more diodes; and said storage capacitor mounted on terminals of said branches.

14. A power supply device as per claim 1, wherein one of said DC/DC converters comprises a reversible chopper circuit comprising two branches wherein each branch comprises one or more branches of two-level or three-level inverters.

15. A power supply device as per claim 1, wherein said DC/DC converter directly supplied by said rectification means is controlled by a modulator which provides a power adjustment thereby ensuring that said DC/DC converters supply power required to compensate for losses in said power supply device and in said load.

16. A power supply device as per claim 15, wherein said modulator supplies a control signal ($S_k$) to switchable semiconductor elements of said DC/DC converter wherein said control signal is supplied by a discriminator having an input signal coming from mean voltage ($U_{moy}$) measurement signals which are measured immediately prior to an energy delivery cycle in each of said storage capacitors.

17. A power supply device as per claim 1, wherein said at least one DC/DC converter not directly supplied by said rectification means is controlled by a modulator which provides a current adjustment to thereby ensure that voltages at terminals of said storage capacitors are substantially continually and uniformly balanced.

18. A power supply device as per claim 17, wherein said modulator supplies a control signal ($S_k$) to switchable semiconductor elements of said at least one DC/DC converter not supplied directly by said rectification means wherein said control signal is supplied by a discriminator having an input signal obtained from voltage measurement signals which measure voltages at said terminals of all of said storage capacitors.

19. A power supply device as per claim 18, wherein said control signals ($S_k$) of said at least one DC/DC converters not supplied directly by said rectification means are staggered with respect to one another in order to stagger voltages generated by said at least one DC/DC converters not supplied directly by said rectification means so that a voltage supplied to said load has a reduced ripple.

20. A device for supplying power to a load requiring both a pre-determined supply of electrical power and high power for short durations of the operating cycle of the load, where the operating cycle is repeated, the power supply device comprising:
  a connection to an electrical grid;
  an AC voltage transformation circuit;
  a voltage rectification means, wherein said rectification means comprises at least one pulse rectifier cell comprising six controllable semiconductor components, GTO or IGCT-type thyristors or IGBT-type transistors, wherein each of said controllable semiconductor components comprises a diode in anti-parallel connection, and a decoupling inductance mounted at each AC input of said rectification means; and a plurality of DC/DC converters mounted in series to terminals of said load, said DC/DC converters each comprise a reversible chopper circuit comprising two branches with each branch comprising one or more diodes mounted in series and one or more switchable semiconductor elements mounted in series and in anti-parallel connection to said one or more diodes; and a storage capacitor mounted on terminals of said branches;

wherein said DC/DC converters are connected to said electrical grid via said AC voltage transformation circuit and said voltage rectification means, and wherein at least one of said DC/DC converters is supplied directly by said voltage rectification means and at least another one of said DC/DC converters is not supplied directly by said voltage rectification means, and wherein said at least one DC/DC converter directly supplied by said rectification means further comprises a modulator which provides a power adjustment signal to said at least one DC/DC converter directly supplied by said rectification means to thereby compensate for losses in said power supply device and in said load, and wherein said at least one DC/DC converter not directly supplied by said rectification means further comprises a modulator which provides a current adjustment signal to thereby substantially continually and uniformly balance voltages at terminals of said storage capacitors, and wherein said current adjustment signals are staggered with respect to one another in order to stagger voltages generated by said at least one DC/DC converters not supplied directly by said rectification means so that a voltage supplied to said load has a reduced ripple.

* * * * *